(12) United States Patent
Welker et al.

(10) Patent No.: US 9,217,805 B2
(45) Date of Patent: Dec. 22, 2015

(54) MONITORING THE QUALITY OF PARTICLE MOTION DATA DURING A SEISMIC ACQUISITION

(75) Inventors: Kenneth E. Welker, Nesoya (NO); Ahmet Kemal Ozdemir, Asker (NO); Espen Gulbransen, Oslo (NO)

(73) Assignee: WesternGeco L.L.C., Houston, TX (US)

( * ) Notice: Subject to any disclaimer, the term of this patent is extended or adjusted under 35 U.S.C. 154(b) by 696 days.

(21) Appl. No.: 12/896,672

(22) Filed: Oct. 1, 2010

(65) Prior Publication Data

US 2012/0082001 A1  Apr. 5, 2012

(51) Int. Cl.
*G01V 1/38* (2006.01)
*G01V 1/28* (2006.01)
*G01V 1/30* (2006.01)

(52) U.S. Cl.
CPC ............... *G01V 1/3808* (2013.01); *G01V 1/28* (2013.01); *G01V 2200/14* (2013.01); *G01V 2210/56* (2013.01)

(58) Field of Classification Search
USPC .......................................... 367/13, 15, 21, 24
See application file for complete search history.

(56) References Cited

U.S. PATENT DOCUMENTS

| | | | |
|---|---|---|---|
| 4,300,220 A | 11/1981 | Goff et al. | |
| 4,922,756 A | 5/1990 | Henrion | |
| 5,049,795 A | 9/1991 | Moulds, III | |
| 5,251,183 A | 10/1993 | McConnell et al. | |
| 5,445,006 A | 8/1995 | Allen et al. | |
| 5,479,161 A | 12/1995 | Keyes et al. | |
| 5,852,242 A | 12/1998 | Devolk et al. | |
| 5,900,529 A | 5/1999 | Hanisko et al. | |
| 6,023,960 A | 2/2000 | Abrams et al. | |
| 6,035,694 A | 3/2000 | Dupuie et al. | |
| 6,070,464 A | 6/2000 | Koury et al. | |
| 6,101,864 A | 8/2000 | Abrams et al. | |
| 6,218,632 B1 | 4/2001 | McCarthy et al. | |
| 6,301,195 B1 | 10/2001 | Faber | |
| 6,353,577 B1 | 3/2002 | Orban et al. | |
| 6,430,105 B1 | 8/2002 | Stephen | |
| 6,497,146 B1 | 12/2002 | Hobbs et al. | |
| 6,497,149 B1 | 12/2002 | Moreau et al. | |
| 6,725,164 B1 | 4/2004 | Bednar | |
| 6,758,080 B1 | 7/2004 | Ragan et al. | |
| 6,805,008 B2 | 10/2004 | Selvakumar et al. | |

(Continued)

FOREIGN PATENT DOCUMENTS

CN  1637391 A  7/2005
CN  2821576 Y  9/2006

(Continued)

OTHER PUBLICATIONS

Kinney, "Characterization of a MEMS Accelerometer for Intertial Navigation Applications, Sandia National Laboratories," 1999: pp. 1-12.

(Continued)

*Primary Examiner* — Ian J Lobo

(57) ABSTRACT

A technique includes acquiring particle motion data from a plurality of particle motion sensors while in tow during a seismic survey. During the seismic survey, the particle motion data are processed without deghosting the particle motion data to determine whether at least some portion of the particle motion data is inadequate for an application that relies on the particle motion data.

33 Claims, 6 Drawing Sheets

(56) References Cited

U.S. PATENT DOCUMENTS

| | | | |
|---|---|---|---|
| 6,814,179 | B2 | 11/2004 | Corrigan et al. |
| 6,861,587 | B1 | 3/2005 | SelVakumar et al. |
| 6,862,938 | B1 | 3/2005 | Park et al. |
| 6,871,544 | B1 | 3/2005 | Selvakumar et al. |
| 6,883,638 | B1 | 4/2005 | Maxwell et al. |
| 6,928,875 | B2 | 8/2005 | Bickford et al. |
| 6,943,697 | B2 | 9/2005 | Ciglenec et al. |
| 6,945,110 | B2 | 9/2005 | Selvakumar et al. |
| 7,012,853 | B2 | 3/2006 | Iseli et al. |
| 7,059,189 | B2 | 6/2006 | Drabe et al. |
| 7,114,366 | B1 | 10/2006 | Jones et al. |
| 7,232,701 | B2 | 6/2007 | Gogoi et al. |
| 7,236,279 | B2 | 6/2007 | Yu et al. |
| 7,273,762 | B2 | 9/2007 | Gogoi |
| 7,274,079 | B2 | 9/2007 | Selvakumar et al. |
| 7,292,504 | B2 | 11/2007 | Luc |
| 7,293,460 | B2 | 11/2007 | Zarabadi et al. |
| 7,337,671 | B2 | 3/2008 | Ayazi et al. |
| 7,426,438 | B1 | 9/2008 | Robertsson |
| 7,595,648 | B2 | 9/2009 | Lasalandra |
| 7,676,327 | B2 | 3/2010 | Ozdemir et al. |
| 7,729,202 | B2 | 6/2010 | Eperjesi et al. |
| 7,734,838 | B2 | 6/2010 | Pavel et al. |
| 7,755,970 | B2 | 7/2010 | Welker et al. |
| 8,104,346 | B2 | 1/2012 | Paulson |
| 8,171,794 | B2 | 5/2012 | Spahlinger |
| 2006/0021435 | A1 | 2/2006 | Orsagh et al. |
| 2006/0055281 | A1 | 3/2006 | Yassini |
| 2006/0061372 | A1 | 3/2006 | Hayakawa et al. |
| 2006/0133202 | A1* | 6/2006 | Tenghamn .............. 367/24 |
| 2006/0233051 | A1* | 10/2006 | Nemeth ................ 367/178 |
| 2007/0286023 | A1 | 12/2007 | Bull et al. |
| 2008/0021658 | A1 | 1/2008 | Pavel et al. |
| 2008/0062815 | A1 | 3/2008 | Iseli |
| 2008/0089174 | A1* | 4/2008 | Sollner et al. ............ 367/21 |
| 2008/0275649 | A1 | 11/2008 | Ozdemir et al. |
| 2008/0312878 | A1 | 12/2008 | Robertsson et al. |
| 2008/0316859 | A1 | 12/2008 | Welker et al. |
| 2009/0003132 | A1 | 1/2009 | Vassallo et al. |
| 2009/0022009 | A1 | 1/2009 | Ozdemir et al. |
| 2009/0056411 | A1 | 3/2009 | Goujon et al. |
| 2009/0296521 | A1* | 12/2009 | Perciot et al. ............ 367/24 |
| 2010/0002541 | A1 | 1/2010 | Ozdemir et al. |
| 2010/0116054 | A1 | 5/2010 | Paulson |
| 2010/0132467 | A1 | 6/2010 | Ko et al. |
| 2010/0135113 | A1* | 6/2010 | Cambois ................ 367/21 |
| 2012/0036931 | A1 | 2/2012 | Paulson |
| 2012/0082001 | A1 | 4/2012 | Welker et al. |

FOREIGN PATENT DOCUMENTS

| | | |
|---|---|---|
| CN | 101033984 A1 | 9/2007 |
| DE | 19959128 A1 | 6/2000 |
| DE | 102004039924 A1 | 2/2006 |
| DE | 102007027652 A1 | 12/2008 |
| EP | 1192419 B1 | 4/2007 |
| EP | 1358488 B1 | 1/2010 |
| GB | 2086055 A | 5/1982 |
| WO | 2010054216 A2 | 5/2010 |

OTHER PUBLICATIONS

Lemkin et al., "A 3-Axis Force Balanced Accelerometer Using a Single Proof-Mass," IEEE, 1997: pp. 1185-1188.

Lubratt et al., "A Voltage-Tunable Microfabricated Accelerometer, Massachussets Institute of Technology," Sep. 1991.

Yuan, et al., "Orientation of Non-Gimballed Three-Component Geophones in Sea-Floor Data," EAGE 59th Conference and Technical Exhibition, May 1997: pp. 1-2.

Wu et al., "Electromechanical ΔΣ Modulation With High-Q Micromechanical Accelerometers and Pulse Density Modulated Force Feedback," IEEE Transactions on Circuits and Systems, Feb. 2006, vol. 53(2): pp. 274-287.

Dong et al., "Force feedback linearization for higher-order electromechanical sigma-delta modulators," J. Micromech. Microeng., 2006, vol. 16: pp. S54-S60.

Dufort et al., "On-Chip Analog Signal Generation for Mixed-Signal Built-In Self-Test," IEEE Journal of Solid-State Circuits, Mar. 1999, vol. 34(3): pp. 318-330.

International Search Report of PCT Application No. PCT/US2009/063579 dated May 31, 2010.

International Search Report and Written Opinion of PCT Application No. PCT/US2011/047337 dated Apr. 6, 2012.

International Search Report and Written Opinion of PCT Application No. PCT/US2011/052091 dated Apr. 18, 2012.

* cited by examiner

MONITORING THE QUALITY OF PARTICLE MOTION DATA DURING A SEISMIC ACQUISITION

BACKGROUND

The invention generally relates to monitoring the quality of particle motion data during a seismic acquisition.

Seismic exploration involves surveying subterranean geological formations for hydrocarbon deposits. A survey typically involves deploying seismic source(s) and seismic sensors at predetermined locations. The sources generate seismic waves, which propagate into the geological formations creating pressure changes and vibrations along their way. Changes in elastic properties of the geological formation scatter the seismic waves, changing their direction of propagation and other properties. Part of the energy emitted by the sources reaches the seismic sensors. Some seismic sensors are sensitive to pressure changes (hydrophones), others to particle motion (e.g., geophones and/or accelerometers), and industrial surveys may deploy only one type of sensor or both. In response to the detected seismic events, the sensors generate electrical signals to produce seismic data. Analysis of the seismic data can then indicate the presence or absence of probable locations of hydrocarbon deposits.

Some surveys are known as "marine" surveys because they are conducted in marine environments. However, "marine" surveys may be conducted not only in saltwater environments, but also in fresh and brackish waters. In one type of marine survey, called a "towed-array" survey, an array of seismic sensor-containing streamers and sources is towed behind a survey vessel.

Advantages and other features of the invention will become apparent from the following drawing, description and claims.

SUMMARY

In an embodiment of the invention, a technique includes acquiring particle motion data from a plurality of particle motion sensors while in tow during a seismic survey. During the seismic survey, the particle motion data are processed without deghosting the particle motion data to determine whether at least some portion of the particle motion data is inadequate for an application that relies on the particle motion data.

Advantages and other features of the invention will become apparent from the following drawing, description and claims.

DETAILED DESCRIPTION

In accordance with embodiments of the invention, which are disclosed herein, particle motion data are monitored as the data are being acquired in a seismic survey so that corrective measures may be timely undertaken in the event that some portion of the data is inadequate for an application that relies on the particle motion data. As non-limiting examples, the application may be a deghosting application; a crossline interpolation application; a concurrent or joint deghosting and crossline interpolation application; etc. The seismic survey and the associated seismic survey monitoring system may take on numerous forms, depending on the particular embodiment of the invention. For the example that is depicted in FIG. 1, a marine-based seismic data acquisition system 10 may be used to conduct the seismic survey.

Figure 1:
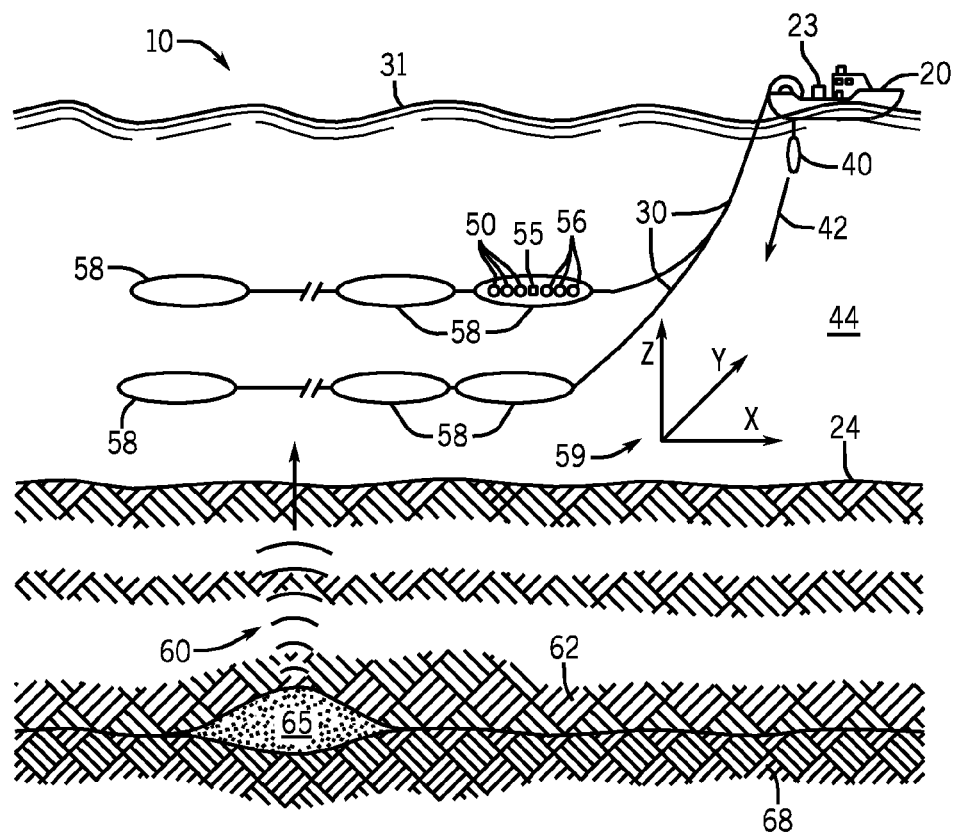
FIG. 1 a schematic diagram of a marine-based seismic acquisition system according to an embodiment of the invention.

For the exemplary marine-based seismic data acquisition system 10 of FIG. 1, a survey vessel 20 tows one or more seismic streamers 30 (two exemplary streamers 30 being depicted in FIG. 1) behind the vessel 20. In one non-limiting example, the streamers 30 may be arranged in a spread in which multiple streamers 30 are towed in approximately the same plane at the same depth. As another non-limiting example, the streamers may be towed at multiple depths, such as in an over/under spread, as depicted in FIG. 1.

Each seismic streamer 30 may be several thousand meters long and may contain various support cables (not shown), as well as wiring and/or circuitry (not shown) that may be used to support communication along the streamers 30. In general, the streamer 30 includes a primary cable into which is mounted seismic sensors that record seismic signals.

In accordance with embodiments of the invention, the streamer 30 is a multi-component streamer, which means that the streamer 30 contains particle motion sensors 56 and pressure sensors 50. The pressure 50 and particle motion 56 sensors may be part of a multi-component sensor unit 58. Each pressure sensor 50 is capable of detecting a pressure wavefield, and each particle motion sensor 56 is capable of detecting at least one component of a particle motion that is associated with acoustic signals that are proximate to the sensor 56. Examples of particle motions include one or more components of a particle displacement, one or more components (inline (x), crossline (y) and vertical (z) components (see axes 59, for example)) of a particle velocity and one or more components of a particle acceleration.

Depending on the particular embodiment of the invention, the streamer 30 may include hydrophones, geophones, particle displacement sensors, particle velocity sensors, accelerometers, pressure gradient sensors, or combinations thereof.

As a non-limiting example, in accordance with some embodiments of the invention, the particle motion sensor 56 measures at least one component of particle motion along a particular sensitive axis 59 (the x, y or z axis, for example). As a more specific example, the particle motion sensor 56 may measure particle velocity along the depth, or z, axis; particle velocity along the crossline, or y, axis; and/or velocity along the inline, or x, axis. Alternatively, in other embodiments of the invention, the particle motion sensor(s) 56 may sense a particle motion other than velocity (an acceleration, for example).

In addition to the streamer(s) 30 and the survey vessel 20, the marine seismic data acquisition system 10 also includes one or more seismic sources 40 (one exemplary seismic source 40 being depicted in FIG. 1), such as air guns and the like. In some embodiments of the invention, the seismic source(s) 40 may be coupled to, or towed by, the survey vessel 20. Alternatively, in other embodiments of the invention, the seismic source(s) 40 may operate independently of the survey vessel 20, in that the source(s) 40 may be coupled to other vessels or buoys, as just a few examples.

As the seismic streamers 30 are towed behind the survey vessel 20, acoustic signals 42 (an exemplary acoustic signal 42 being depicted in FIG. 1), often referred to as "shots," are produced by the seismic source(s) 40 and expand radially with a vertical component through a water column 44 into strata 62 and 68 beneath a water bottom surface 24. The acoustic signals 42 are reflected from the various subterranean geological formations, such as an exemplary formation 65 that is depicted in FIG. 1.

The incident acoustic signals 42 that are created by the seismic source(s) 40 produce corresponding reflected acoustic signals, or pressure waves 60, which are sensed by the towed seismic sensors. It is noted that the pressure waves that are received and sensed by the seismic sensors include "up going" pressure waves that propagate to the sensors without reflection, as well as "down going" pressure waves that are produced by reflections of the pressure waves 60 from an air-water boundary, or free surface 31.

The seismic sensors generate signals (digital signals, for example), called "traces," which indicate the acquired measurements of the pressure and particle motion wavefields. The traces are recorded and may be at least partially processed by a signal processing unit 23 that is deployed on the survey vessel 20, in accordance with some embodiments of the invention. For example, a particular pressure sensor 50 may provide a trace, which corresponds to a measure of a pressure wavefield by its hydrophone; and a given particle motion sensor 56 may provide (depending on the particular embodiment of the invention) one or more traces that correspond to one or more components of particle motion.

The goal of the seismic acquisition is to build up an image of a survey area for purposes of identifying subterranean geological formations, such as the exemplary geological formation 65. Subsequent analysis of the representation may reveal probable locations of hydrocarbon deposits in subterranean geological formations. Depending on the particular embodiment of the invention, portions of the analysis of the representation may be performed on the seismic survey vessel 20, such as by the signal processing unit 23. In accordance with other embodiments of the invention, the representation may be processed by a data processing system that may be, for example, located on land, on a streamer 30, distributed on several streamers 30, on a vessel other than the vessel 20, etc.

Monitoring systems and techniques are disclosed herein for purposes of monitoring particle motion measurements in real time or in near real time while the seismic survey is being performed so that corrective measures may be timely undertaken if needed to save the time and expenses that would otherwise be incurred acquiring data that does not meet survey specification or is otherwise not of adequate quality to produce the advantage gained with a particle motion sensor. In this manner, should the particle motion data or a portion of it be deemed to be inadequate, the survey may be halted or changed so that certain corrective action measures may be implemented (replacing a failed streamer section, limiting or changing the steering, changing the towing depth(s) of streamer(s), etc.) in order to bring the acquired particle motion data back into compliance. Without a system in place for monitoring the particle motion data (as disclosed herein), the particle motion data would be acquired blindly, and only after acquisition is completed may a determination be made regarding whether another acquisition is required; and if processing takes a significantly longer time than acquisition, discovery that the dataset collected is inadequate may only be accomplished after the survey is completed. Although an alternative approach may be to plan a seismic survey by including extra sensors to oversample critical measurements, this approach may be significantly more expensive to implement.

Figure 2:
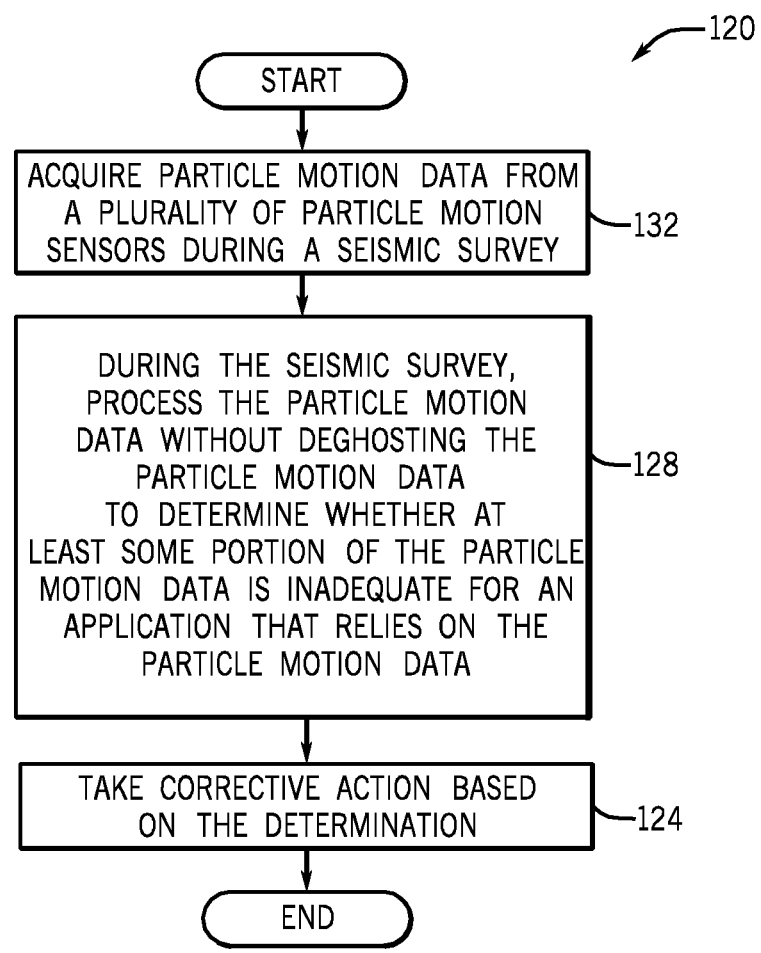
FIG. 2 is a flow diagram depicting a technique to monitor and control the acquisition of particle motion data during a seismic survey according to an embodiment of the invention.

Thus, referring to FIG. 2, a technique 120 that is used in accordance with embodiments of the invention includes acquiring (block 124) particle motion data from a plurality of particle motion sensors towed during a seismic survey. During the seismic survey, the particle motion data are processed (block 128) without deghosting the particle motion data to determine whether at least some portion of the particle motion data is inadequate for an application that relies on the particle motion data, such as a deghosting or crossline interpolation application. Based on this determination, corrective action may be taken, pursuant to block 132.

Figure 3A:
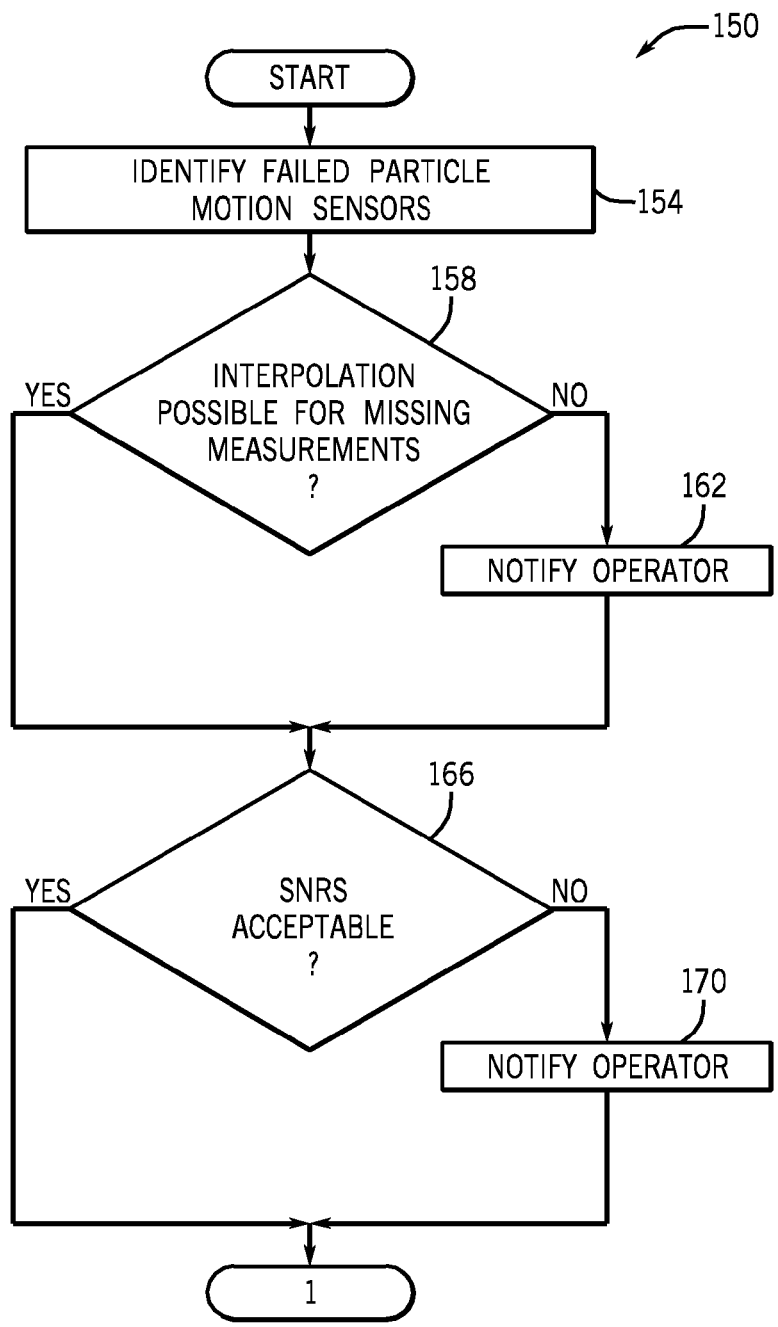
FIGS. 3A and 3B depict a flow diagram of a technique to perform quality control analysis on particle motion data acquired during a seismic survey according to an embodiment of the invention.
Figure 3B:
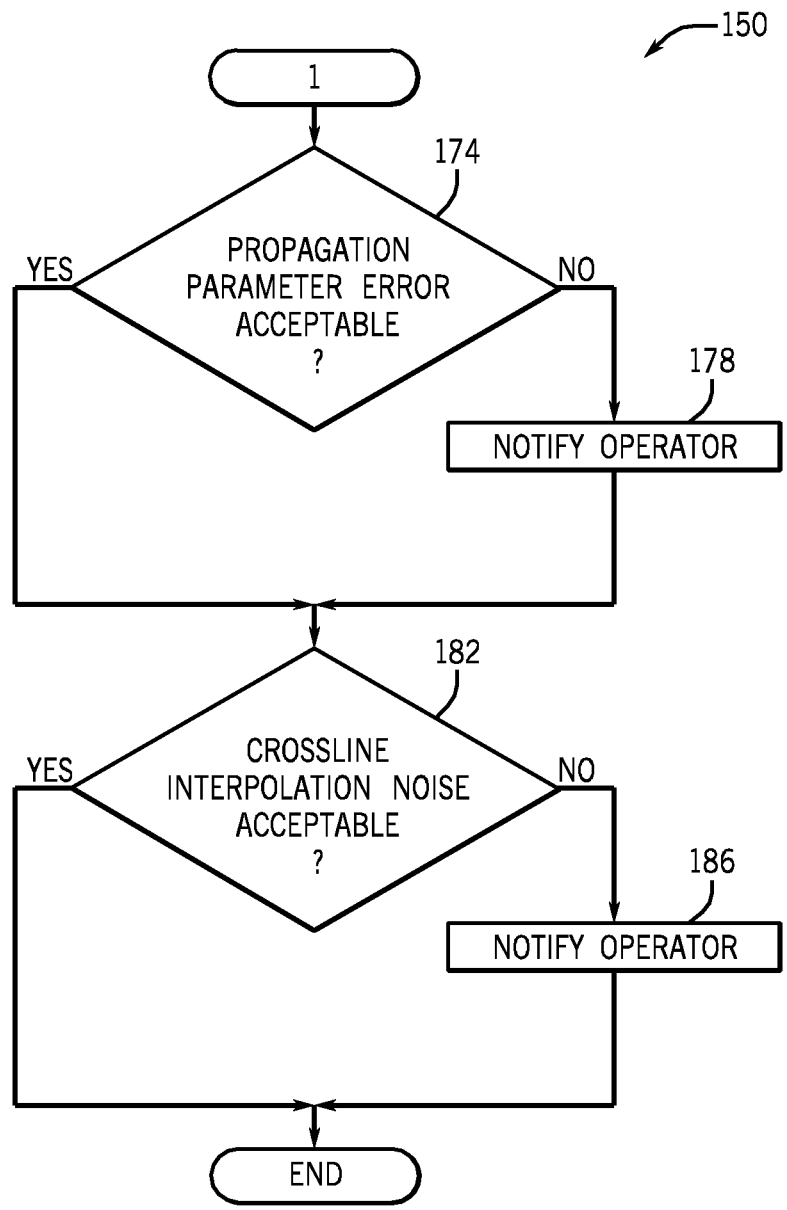

Referring FIGS. 3A and 3B, in accordance with some embodiments of the invention, a technique 150 may be used for purposes of performing quality control analysis on the particle motion data as the particle motion data are being acquired during a seismic survey. The technique 150 may be executed continuously or intermittently, during the seismic survey depending on the particular implementation. Furthermore, although FIGS. 3A and 3B depict a sequence of actions, these actions may be performed in any sequence, in parallel or in a sequential and parallel fashion, depending on the particular implementation.

According to the technique 150, failed particle motion sensors are first identified, pursuant to block 154. In this context, a "failed" sensor means a sensor that is "dead," has an unacceptable noise level (as might occur due to steering induced cross flow noise), is unable to resolve the gravity vector due to a non alignment with the gravity vector as would occur with a single axis failed gimbal device, or exhibits any other characteristic that causes the data that are acquired by the sensor to be unacceptable. As a non-limiting example, a technique for identifying a failed particle motion sensor involves comparing a noise level of the sensor to corresponding noise levels of nearby particle motion sensors. More specifically, as most streamer noise decays exponentially in amplitude with increasing frequency, the root mean square (RMS) of the high frequency (around 200 Hz) particle motion data may be used as an indicator of the sensor's noise. In this manner, the RMS magnitude of each of the neighboring channels may be spatially filtered by using a median filter to estimate a mean noise level. The RMS magnitude levels of individual channels may be compared against the mean noise level to detect outliers and thus, detect sensors that are unacceptably noisy, weak, defective, etc.

Pursuant to the technique 150, after the failed particle motion sensors have been identified, a determination is then made (diamond 158) whether interpolation may be used to derive the corresponding failed measurements. In this regard, if a particular filter relies on inline sampling, a determination is made whether the inline sampling is adequate to derive the missing data. Likewise, if the filter depends on crossline sampling, then a determination is made whether there are adequate crossline samples available. For some cases, the filters may depend both on inline and crossline sampling, and for this case, the available crossline and inline samples are analyzed to determine whether sufficient data exists to use interpolation to derive the missing data.

One way to evaluate whether interpolation is possible is to estimate the interpolation noise. For example, a technique that is described in U.S. patent application Ser. No. 12/168, 125, entitled, "INTERPOLATING SEISMIC DATA," filed on Jul. 5, 2008, which is hereby incorporated by reference in its entirety, may be used in accordance with some embodiments of the invention, to estimate the interpolation noise. The magnitude of the interpolation noise and its spread in space may be used to assess whether it is possible to continue survey; or whether any hardware (streamer sections or specific particle motion sensors or multi-component units, for example) needs to be replaced before continuing the survey; or whether steering of the streamers needs to be controlled in a different manner. If interpolation is not possible for the missing measurements given the current operating parameters, then the operator is notified, pursuant to block 162. It is notified that the operator may also be notified about corrective measures that may be implemented to decrease the interpolation noise to an acceptable level.

The technique 150 may perform various other quality control measures on the particle motion data, such as determining (diamond 166) whether expected signal-to-noise ratios (SNRs) are acceptable. In this manner, an estimate of the noise spectra may be determined for every shot by processing the particle motion data at a time before direct arrival. This estimated noise level provides an indication of the expected SNR. Additionally, in accordance with some embodiments of the invention, the estimated noise spectra together with a ghost model is used to estimate the noise level on the upgoing pressure wavefield without actually performing the deghosting step, as described in U.S. Patent Application Publication No. US20080275649A1, entitled "METHOD FOR OPTIMAL WAVE FIELD SEPARATION," which was filed on Apr. 26, 2007, and is hereby incorporated by reference in its entirety. The estimated noise level provides an indication of the expected SNR of the upgoing pressure wavefield. If either the expected SNR of the particle motion measurement before direct arrival or the expected SNR of the upgoing pressure wavefield is unacceptable (the SNR is below a predefined threshold, for example), then the technique 150 includes notifying (block 170) the operator about the inadequate SNR(s), as well as notifying the operator about corrective measures that may be implemented to inverse the SNR(s) to the appropriate level(s).

As another quality control measure, the technique 150, in accordance with some embodiments of the invention, determines (diamond 174) whether a propagation parameter error is acceptable, pursuant to diamond 174. For example, in accordance with some embodiments of the invention, an error function, which is associated with the survey propagation parameters (cable depth, reflection coefficient at sea surface, speed of sound in water, etc.) may be determined by using a cost function, such as the one that is described in U.S. patent application Ser. No. 11/779,797, entitled "SYSTEM AND TECHNIQUE TO ESTIMATE PHYSICAL PROPAGATION PARAMETERS ASSOCIATED WITH A SEISMIC SURVEY," which was filed on Jul. 18, 2007 and is hereby incorporated by reference in its entirety. The magnitude of the cost function should be relatively small when the used survey parameters match the actual physical parameters. Thus, diamond 174 may involve comparing the cost function to a predetermined threshold to determine whether the propagation parameter error is acceptable. If not, the operator is notified, pursuant to block 178 about the unacceptable propagation error as well as notifying the operator about corrective measures that may be implemented to decrease the propagation parameter error to an acceptable level. As an example, corrective measures, such as the ones set forth in U.S. Patent Application Publication No. US20080316859A1, entitled, "METHODS FOR CONTROLLING MARINE SEISMIC EQUIPMENT ORIENTATION DURING ACQUISITION OF MARINE SEISMIC DATA," which was filed on Jun. 22, 2007, and is hereby incorporated by reference in its entirety, may be used.

Crossline interpolation noise may also be used as a quality control measure. In this regard, in accordance with some embodiments of the invention, the technique 150 includes determining (diamond 182) whether an expected crossline interpolation noise is acceptable. In this regard, the streamer positions; the estimated particle motion noise level; the estimated pressure noise level; and the cable depth may be used to estimate an expected crossline interpolation noise. The expected crossline interpolation noise may be compared with a predefined threshold to determine whether the depth or spacing of the cables need to be modified (through steering or rigging, for example) or other measures need to be implemented to reduce the crossline interpolation noise. If the expected crossline interpolation noise is unacceptable, then the operator is notified, pursuant to block 186 about the inadequate crossline interpolation noise, as well as notifying the operator about corrective measures that may be implemented to decrease the crossline interpolation noise to an acceptable level.

In accordance with some embodiments of the invention, the particle motion sensor may be a microelectromechanical system (MEMS) sensor. A MEMS sensor is a sensor that is made using microelectronics in combination with micromachining technology. A MEMS sensor has a generally flat amplitude versus frequency response, which extends down to zero frequency (DC). As a result, the MEMS sensor can record the gravitational field along its axis. The gravitational acceleration may be assumed to be almost stationary with respect to time involved in a typical shot interval. Therefore, the gravitational acceleration sensed by a stationary MEMS sensor appears as a DC signal. As described further below, this sensed gravitational acceleration may be used for purposes of quality control to sense the MEMS sensor's orientation and for purposes of identifying data glitches.

In a towed marine acquisition, the streamer cable experiences angular rotations, which result in a non-zero bandwidth of the measured gravitational component around zero Hz. However, due to the physical dimensions of the cable, the tension along the cable and steering elements, relatively large high frequency large amplitude angular movements are filtered out. Therefore, the bandwidth of the measured gravitational acceleration is typically limited to frequencies below 1 Hz. Furthermore, the gravitational field in a survey area typically varies slowly with respect to the shot interval.

Figure 4:
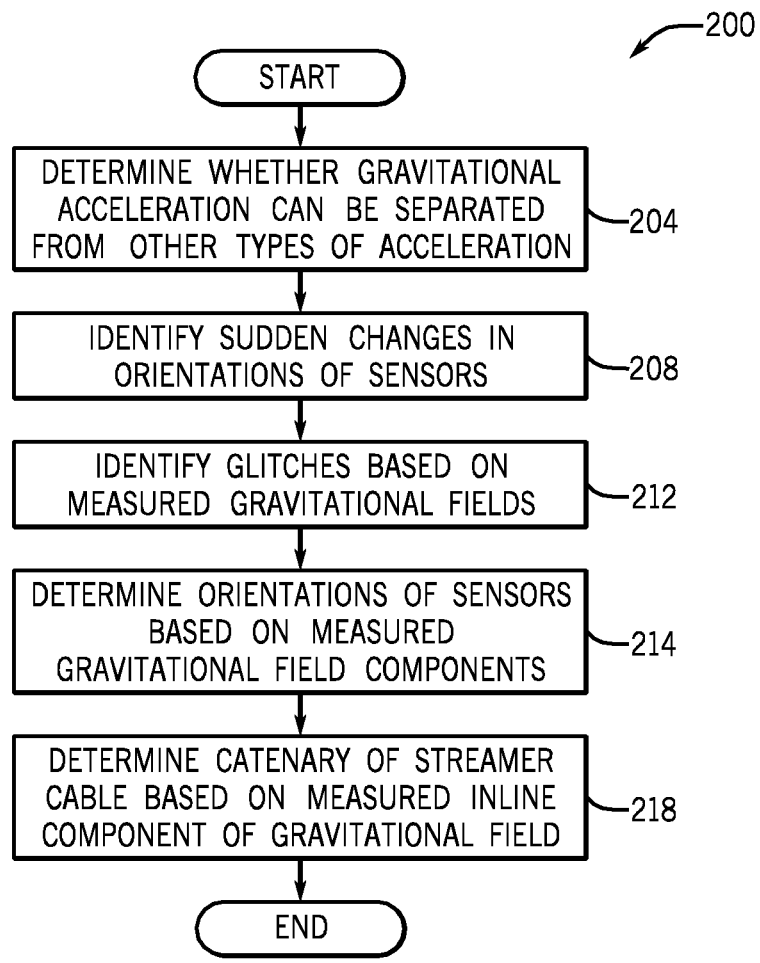
FIG. 4 is a flow diagram depicting a technique to perform quality control analysis on particle motion data acquired by microelectromechanical system (MEMS) sensors during a seismic survey according to an embodiment of the invention.

In accordance with some embodiments of the invention, for surveys in which MEMS sensors are used as particle motion sensors, a technique 200 that is depicted in FIG. 4 may be used for purposes of performing quality control analysis. It is noted that based on the quality control measures set forth in the technique 200, an operator may be alerted as to whether corrective action may be needed and may be notified as to what correction action is recommended, although the notification of the operator is not specifically highlighted in FIG. 4. Pursuant to the technique 200, the MEMS sensor-based particle motion data is processed to determine (block 204) whether gravitational acceleration can be separated from other types of measured acceleration. In this regard, the particle motion spectra at frequencies below 1 Hz may be determined as a function of time to assess whether the gravitational acceleration may be separated from other types of accelerations (vibrational acceleration, for example) which typically have significantly lower amplitude levels.

The technique 200 also includes identifying (block 208) sudden changes in the orientation of the MEMS-based sensors. In this regard, the comparison of the orientation of the neighboring sensors estimated from the measured gravitational field may be tracked to detect sudden changes in relative orientations. In a solid cable that has a stiff carrier, the relative orientation of the neighboring sensors is determined during manufacturing and should not experience rapid inconsistent variations during a survey. Such a sudden change may indicate a defective sensor. It is noted that momentary sudden change may also identify, pursuant to block 212, a temporary glitch in the measured particle motion data.

The technique 200 also includes determining (block 214) the orientation of the MEMS-based particle motion sensor based on the measured components of the gravitational field. In this regard, by using each component of the measured gravitation vector, the orientation of the sensor may be estimated with respect to a fixed reference frame. For example, the depth (z) axis may be oriented in the true vertical direction, which defines corresponding ideal inline (x) and crossline (y) axes (see axes 59 of FIG. 1). Although the orientation of the streamer cable may experience variations due to angular acceleration, these variations should not be large angles because the high frequency variations may be mechanically filtered in a long-tensioned streamer cable. By determining the orientations of the particle motion sensors, a determination may then be made whether particular sensors have a sufficient orientation to support processing of the particle motion data. In this manner, the sensor orientations may be evaluated for purposes of determining whether certain interpolation (crossline interpolation, for example) may be performed. Therefore, based on the results of the sensor orientations, a determination may be made whether the particle motion data is adequate or whether corrective action is needed.

In accordance with some embodiments of the invention, the technique 200 also determines the catenary of the streamer cable, pursuant to block 218. The catenary of the streamer cable is the general curve (ideally flat or horizontal) of the cable in the x-z plane. The catenary is estimated by using the measured inline components of the gravitational field measured by the MEMS sensors. In this regard, the gravitational inline component is zero for all of the sensors when the streamer cable is perfectly horizontal. Based on the determined catenary, a decision may then be made whether the catenary of the cable is sufficient to allow certain interpolation (crossline interpolation, for example) without undertaking corrective action to halt or change the survey.

In addition to revealing failure of individual particle motion measurement devices, such measurement scrutiny can also reveal other abnormal acquisition situations, such as a poorly ballasted cable, cable twisting, or debris entanglement along the cable. Such a determination can be made for instance if the inline measurement device measures a large component of gravity when in a well ballasted cable it would only measure a very small component of gravity. Similarly local anomalous inline and crossline vibration frequency particle motions would be measured if the cable were not oriented in the usual way due to the presence of debris causing the cable to be twisted.

Figure 5:
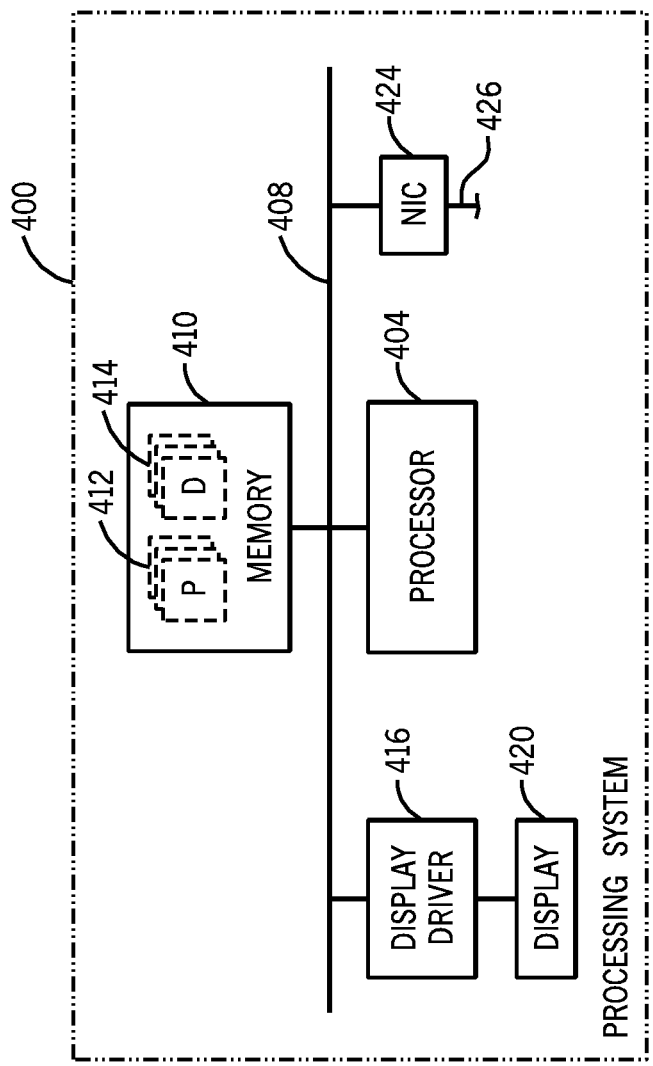
FIG. 5 is a schematic diagram of a data processing system according to an embodiment of the invention.

Referring to FIG. 5, in accordance with some embodiments of the invention, a data processing system 400 may be used for purposes of performing the seismic data quality control analyses that is disclosed herein. The data processing system 400 may be part of the signal processing unit 23 (see FIG. 1) in some implementations. It is noted that the architecture of the processing system 400 is illustrated merely as an example, as the skilled artisan would recognize many variations and deviations therefrom. For example, in some embodiments of the invention, the processing system may be a distributed system that is located at different local and/or remote locations. All or part of the data processing system may be disposed on the vessel 20, on a streamer 30, on a platform, at a remote processing facility, etc., depending on the particular embodiment of the invention.

In the example that is depicted in FIG. 5, the data processing system 400 includes a processor 404, which executes program instructions 412 that are stored in a system memory 410 for purposes of causing the processor 404 to perform some or all of the techniques that are disclosed herein. As non-limiting examples, the processor 404 may include one or more microprocessors and/or microcontrollers, depending on the particular implementation. In general, the processor 404 may execute program instructions 412 for purposes of causing the processor 404 to perform all or parts of the techniques 120, 150 and/or 200, which are disclosed herein as well as other particle motion quality control techniques, in accordance with various embodiments of the invention.

The memory 410 may also store datasets 414 which may be initial, intermediate and/or final datasets produced by the processing by the processor 404. For example, the datasets 414 may include data indicative of seismic data, particle motion data, model parameters, specification thresholds, steering parameters, identified defective sensors, identified defective streamer sections, etc.

As depicted in FIG. 5, the processor 404 and memory 410 may be coupled together by at least one bus 408, which may couple other components of the processing system 400 together, such as a network interface card (NIC) 424. As a non-limiting example, the NIC 424 may be coupled to a network 426, for purposes of receiving such data as particle motion data, specification thresholds, model parameters, etc. As also depicted in FIG. 5, a display 420 of the processing system 408 may display initial, intermediate or final results produced by the processing system 400. In general, the display 420 may be coupled to the system 400 by a display driver 416. As a non-limiting example, the display 420 may display an image, which graphically depicts quality control results, failed hardware, seismic images, survey configuration, etc.

Other variations are contemplated and are within the scope of the appended claims. For example, in accordance with other embodiments of the invention, the techniques and systems that are disclosed herein may be used with seismic acquisition systems other than towed systems. In this regard, the systems and techniques that are disclosed herein may be used in connection with land-based surveys, seabed-based surveys, borehole-based surveys, etc.

While the present invention has been described with respect to a limited number of embodiments, those skilled in the art, having the benefit of this disclosure, will appreciate numerous modifications and variations there from. It is intended that the appended claims cover all such modifications and variations as fall within the true spirit and scope of this present invention.

What is claimed is:

1. A method comprising:
   acquiring particle motion data from a plurality of particle motion sensors while in tow during a seismic survey of a geologic structure, the particle motion data representing particle motions sensed by the particle motion sensors due to at least one seismic event;
   during the seismic survey, processing the particle motion data to determine whether at least some portion of the particle motion data is inadequate for a seismic data processing application that relies on the at least some portion of the particle motion data; and selectively processing the at least some portion of the particle motion data using the seismic data processing application to determine a characteristic of the geologic structure based at least in part on the determination whether at least some portion of the particle motion data is inadequate for the seismic data processing application.

2. The method of claim 1, further comprising:
taking corrective action based at least in part on the determination of whether at least some portion of the particle motion data is inadequate.

3. The method of claim 2, wherein the seismic survey comprises a towed seismic survey, and the act of taking corrective action comprises replacing a failed streamer section or changing how at least one streamer is towed or steered.

4. The method of claim 1, wherein the application comprise at least one of the following:
a deghosting application;
a crossline interpolation application;
a joint deghosting and crossline application; or
another application that depends on a number of minimum particle motion measurements.

5. The method of claim 1, wherein the act of processing the particle motion data to determine whether at least some portion of the particle motion data is inadequate comprises:
identifying at least one particle motion sensor of the plurality of particle motion sensors that has failed.

6. The method of claim 5, wherein the act of processing the particle motion data to determine whether at least some portion of the particle motion data is inadequate further comprises:
identifying a particle motion sensor of the plurality of particle motion sensors that has failed and determining whether interpolated data may be substituted for data otherwise provided by the failed particle motion sensor such that the substituted data is adequate for an application that relies on the particle motion data.

7. The method of claim 1, wherein the act of processing the particle motion data to determine whether at least some portion of the particle motion data is inadequate comprises:
determining whether an expected signal-to-noise ratio to be derived from the particle motion data is inadequate.

8. The method of claim 7, wherein the signal-to-noise ratio comprises at least one of an expected signal-to-noise ratio before direct arrivals at the plurality of particle motion sensors and an estimated signal-to-noise ratio for an upgoing pressure wavefield determined using the particle motion data.

9. The method of claim 1, wherein the act of processing the particle motion data to determine whether at least some portion of the particle motion data is inadequate comprises:
determining whether an error determined from propagation parameters derived from the particle motion data is adequate.

10. The method of claim 1, wherein the act of processing the particle motion data to determine whether at least some portion of the particle motion data is inadequate comprises:
determining whether an expected crossline interpolation error is inadequate.

11. The method of claim 1, wherein
the particle motion sensors comprise microelectromechanical system (MEMS) sensors, each of the MEMs sensors adapted to measure gravitational acceleration, and
the act of processing the particle motion data to determine whether at least some portion of the particle motion data is inadequate comprises determining whether the particle motion data can be processed to separate the gravitational acceleration from other types of acceleration.

12. The method of claim 1, wherein
the particle motion sensors comprise microelectromechanical system (MEMS) sensors, and
the act of processing the particle motion data to determine whether at least some portion of the particle motion data is inadequate comprises identifying sudden changes in orientation of at least one of the MEMs sensors.

13. The method of claim 1, wherein
the particle motion sensors comprise microelectromechanical system (MEMS) sensors, each of the MEMs sensors adapted to measure a gravitational field, and
the act of processing the particle motion data to determine whether at least some portion of the particle motion data is inadequate comprises for each MEMs sensor identifying a glitch in data acquired by the MEMs sensor based on the gravitational field measured by the MEMs sensor and the gravitational field measured by at least one other MEMs sensor.

14. The method of claim 1, wherein
the particle motion sensors comprise microelectromechanical system (MEMS) sensors, each of the MEMs sensors adapted to measure a gravitational field, and
the act of processing the particle motion data to determine whether at least some portion of the particle motion data is inadequate comprises for each MEMs sensor determining an orientation of the sensor based on the gravitational field measured by the sensor.

15. The method of claim 1, wherein
the particle motion sensors comprise microelectromechanical system (MEMS) sensors disposed on a streamer cable, each of the MEMs sensors adapted to measure an inline component of a gravitational field, and
the act of processing the particle motion data to determine whether at least some portion of the particle motion data is inadequate comprises determining a catenary of the streamer cable based on the measured inline components.

16. A system comprising:
an interface to receive particle motion data being acquired from a plurality of particle motion sensors while in tow during a seismic survey, the particle motion data representing particle motions sensed by the particle motion sensors due to at least one seismic event; and
a processor to, during the seismic survey, process the particle motion data to determine whether at least some portion of the particle motion data is inadequate for an application that relies on the particle motion data,
wherein the processing by the processor comprises:
determining whether the particle motion data can be processed to separate a gravitational acceleration sensed by the particle motion sensors from other types of acceleration;
identifying sudden changes in orientation of at least one of the particle motion sensors;
determining an orientation of at least one of the particle motion sensors based on a gravitational field measured by the sensor; or
determining a catenary of the streamer cable based on inline components of a gravitational field measured by the particle motion sensors.

17. The system of claim 16, further comprising:
at least one seismic streamer, the particle motion sensors being disposed on said at least one seismic streamer; and
a vessel to tow said at least one seismic streamer.

18. The system of claim 17, wherein the processor is located on the streamer or on the vessel.

19. The system of claim 17, wherein the particle motion sensors comprise at least one of more of the following: accelerometers, microelectromechanical system (MEMs) sensors and gradient sensors.

20. The system of claim 16, wherein the processor is adapted to process the particle motion data to:
identify at least one particle motion sensor of the plurality of particle motion sensors that has failed.

21. The system of claim 16, wherein the processor is adapted to process the particle motion data to:
determine whether a signal-to-noise ratio derived from the particle motion data is adequate.

22. The system of claim 16, wherein the processor is adapted to process the particle motion data to:
determine whether an error determined from propagation parameters derived from the particle motion data is adequate.

23. The system of claim 16, wherein the processor is adapted to process the particle motion data during the survey to:
determine whether an expected crossline interpolation error is adequate.

24. The system of claim 16, wherein at least some of the particle motion sensors are disposed on a seismic streamer cable, and the processor is adapted to process the particle motion data to determine the catenary of the cable.

25. The system of claim 16, wherein at least some of the particle motion sensors are disposed on a seismic streamer cable, and the processor is adapted to process the particle motion data to determine whether the cable is inadequately ballasted, twisted, or entangled with debris.

26. An article comprising a computer readable storage medium to store instructions that when executed cause a computer to:
receive particle motion data being acquired from a plurality of particle motion sensors while in tow during a seismic survey of a geologic structure, the particle motion data representing particle motions sensed by the particle motion sensors due to at least one seismic event;
during the seismic survey, process the particle motion data to determine whether at least some portion of the particle motion data is inadequate for an application that relies on the particle motion data; and
selectively determine at least one characteristic of the geologic structure using the particle motion data based at least in part on the determination whether at least some portion of the particle motion data is inadequate for the application.

27. The article of claim 26, the storage medium storing instructions that when executed by the computer cause the computer to:
identify at least one particle motion sensor of the plurality of particle motion sensors that has failed.

28. The article of claim 26, the storage medium storing instructions that when executed by the computer cause the computer to:
determine whether a signal-to-noise ratio derived from the particle motion data is adequate.

29. The article of claim 26, the storage medium storing instructions that when executed by the computer cause the computer to:
determine whether an error determined from propagation parameters derived from the particle motion data is adequate.

30. The article of claim 26, the storage medium storing instructions that when executed by the computer cause the computer during the survey to:
determine whether an expected crossline interpolation error is adequate.

31. The article of claim 26, the storage medium storing instructions that when executed by the computer cause the computer to process the particle motion data to determine the catenary of the cable.

32. The article of claim 26, the storage medium storing instructions that when executed by the computer cause the computer to process the particle motion data to determine whether a seismic streamer cable on which at least some of the particle motion sensors are disposed is inadequately ballasted, twisted, or entangled with debris.

33. A method comprising:
acquiring particle motion data from a plurality of particle motion sensors while in tow during a seismic survey, the particle motion data representing particle motions sensed by the particle motion sensors due to at least one seismic event; and
during the seismic survey, processing the particle motion data to determine whether at least some portion of the particle motion data is inadequate for an application that relies on the particle motion data, wherein processing the particular motion to determine whether at least some portion of the particular motion data is adequate comprises:
determining whether the particle motion data can be processed to separate a gravitational acceleration sensed by the particle motion sensors from other types of acceleration;
identifying sudden changes in orientation of at least one of the particle motion sensors;
determining an orientation of at least one of the particle motion sensors based on a gravitational field measured by the sensor; or
determining a catenary of the streamer cable based on inline components of a gravitational field measured by the particle motion sensors.

* * * * *